United States Patent Office 3,065,346
Patented Nov. 20, 1962

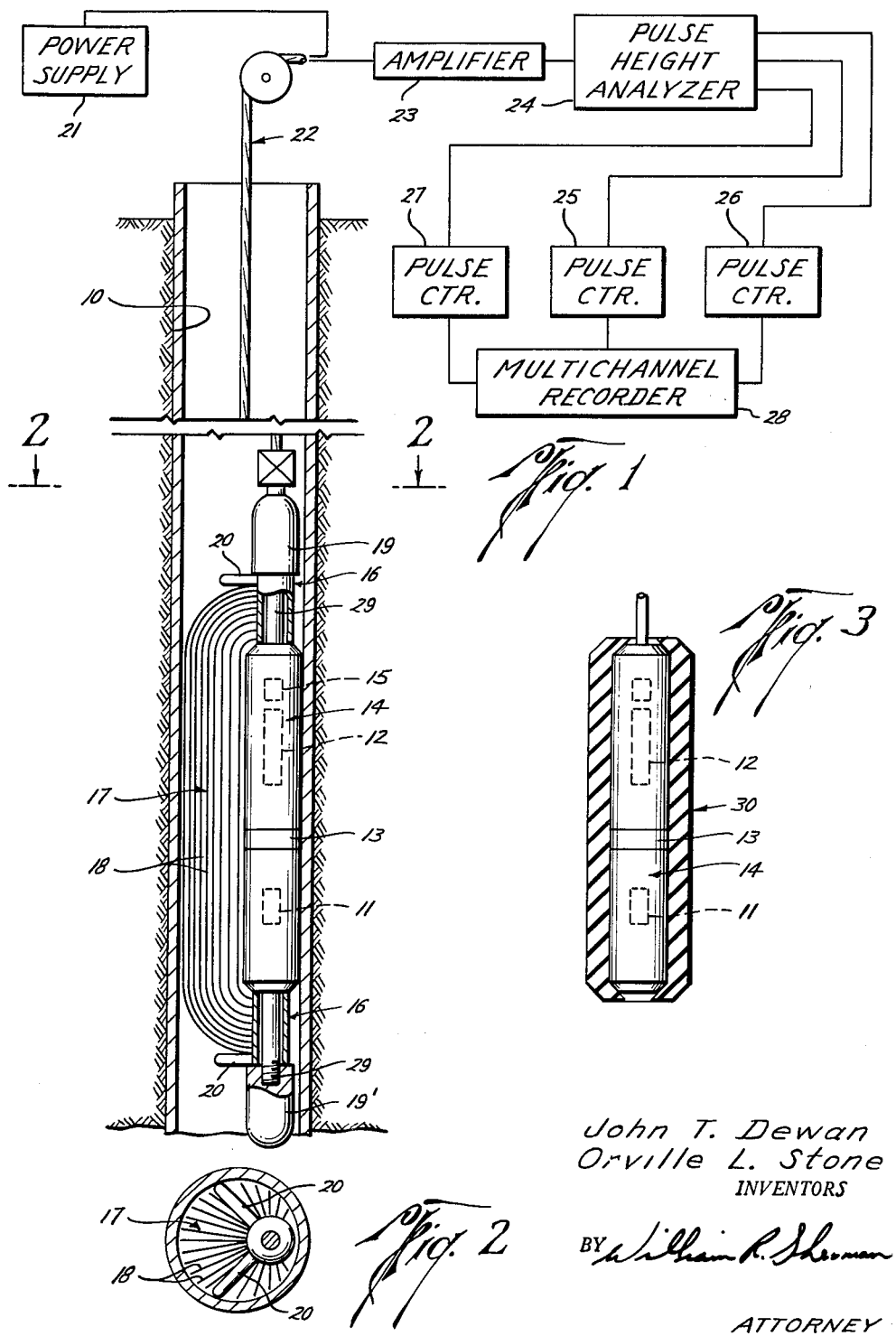

3,065,346
RADIOACTIVE BOREHOLE LOGGING
APPARATUS
John T. Dewan and Orville L. Stone, Houston, Tex., assignors to Schlumberger Well Surveying Corporation, Houston, Tex., a corporation of Texas
Filed Nov. 12, 1959, Ser. No. 852,258
7 Claims. (Cl. 250—83.3)

This invention relates to apparatus for reducing the effect of the borehole fluid and casing and sonde material on the detection system in neutron logging. In radioactivity logging where capture gamma rays are detected, as in conventional neutron-gamma logging or selective neutron-gamma logging, there is an appreciable contribution to the detector counting rate from capture gamma rays originated by thermal or epithermal neutrons being captured by the borehole fluid, by the pressure housing and by the well casing if such is present. This is undesirable since those neutrons which never travel outside the casing until captured give no useful information concerning the formation surrounding the borehole. Those neutrons which spend part of their life in the formation and which are captured either in the borehole fluid, the pressure housing or by the casing are only partially information-bearing in the case of conventional neutron-gamma logging and give no information in the case of selective neutron-gamma logging wherein the energy as well as the intensity of capture gamma rays is being measured.

Since the detection of noninformation-bearing gamma rays only serves to confuse the interpretation of the results of the logging operation, it is an object of this invention to provide new and improved radioactivity logging apparatus arranged for detecting gamma rays, to the exclusion of gamma rays resulting from capture of neutrons in the borehole fluid, the pressure housing or the casing.

It is a further object of this invention to provide such apparatus which operates effectively while limiting to a practical range the requirement for exclusion of borehole fluid between the wall of the borehole and sonde or pressure-resistant housing.

Another object of the invention is to provide an apparatus which substantially reduces the effect of the borehole fluid or mud in the borehole on the desired information.

The apparatus which we have invented displaces a substantial portion of the liquid surrounding the logging tool and replaces it with a substance having a large neutron capture cross section and which emits either no capture gamma rays or only very low energy capture gamma rays. In this way it is possible to capture most of the thermal and epithermal neutrons present in the borehole before they are captured by any remaining fluid or by the iron or steel present in the housing and casing. Therefore, in one embodiment of the invention, we propose that a sufficient quantity of boron or lithium be distributed throughout the borehole surrounding the housing through the use of a glass fiber comprised of silica, boron oxide, sodium oxide and alumina and hereinafter referred to as borosilicate glass fiber and commercially available as Pyrex. This distribution is brought about through the use of cloth strips or strands arranged as in a rag mop to occupy the space which would otherwise be occupied by the mud. In an alternative embodiment, a plastic or rubber sleeve, loaded with boron, covers the sonde and is designed to fill the borehole as completely as is practicable.

In order that our invention may be more fully understood, we will now describe it in detail with reference being made to the accompanying drawings in which:

FIG. 1 is a diagram of one embodiment of the invention and shows in a block diagram exemplary electronic circuitry which may be used in providing indications of the information from the capture gamma ray detector.

FIG. 2 is a top view of the borehole, sonde and mop.

FIG. 3 is a modification of the invention showing a fluid displacing sleeve containing a suitable thermal and epithermal neutron absorbing substance mounted on the sonde.

Referring now to FIG. 1; a neutron source 11 and a gamma ray detector 12, such as a scintillation detector, suitably shielded from direct radiation from neutron source 11 by a shield indicated schematically at 13, are shown. The neutron source 11, detector 12, shield 13 and associated downhole circuits 15 are mounted in an elongated, fluid-tight housing 14. Collars 16 are mounted above and below the housing 14 and are connected throughout approximately 270° of their circumference by a borosilicate glass fiber mop 17 comprised of individual strips of cloth or rope 18. This cloth is made from borosilicate glass fiber containing sufficient boron to fill the space surrounding the housing 14 and particularly the region about the source and detector with approximately 1% by weight or more of boron. It will be apparent to those skilled in the art that the size of the mop 17 will be dependent upon the size of the borehole or casing 10 and the housing 14.

Lithium, which gives virtually no neutron capture gamma rays, is excellent to use for the capturing substance. However, borosilicate glass containing boron is practical since the gamma ray liberated when a thermal or epithermal neutron is captured by a boron atom has only .48 mev. energy and gamma rays with this energy can be shielded from the detector 12 or "biased out" if a scintillation detector is used. Because the capture gamma rays liberated when a hydrogen atom, a chlorine or an iron atom captures a thermal or epithermal neutron are 2.23 mev. for hydrogen and up to 7 mev. for chlorine and iron, and since it is not possible to effectively shield or bias out gamma rays of this order of magnitude without seriously affecting the sensitivity of the logging instrument, it is desirable to provide as great a probability as possible that the neutrons will be captured by boron rather than hydrogen, chlorine or iron.

Therefore, it is of importance to fill the space surrounding the housing 14 as completely and uniformly as practicable in order to have a minimum of non-interrupted borehole fluid and so that the housing and casing, if present, will have the high capture cross section element near them. We have determined that the mop 17 should be designed to mingle with the fluid in the borehole 10 that surrounds the housing 14 so that there will be little chance that the mud will be uninterrupted for more than ½ inch. This distance is sufficient to insure that most of the thermal and epithermal neutrons will be captured by the boron, since the root mean square travel of thermal or epithermal neutrons in water is in the neighborhood of two to three inches.

Collars 16 are more effective in aiding an even distribution of the mop 17 through the borehole fluid if they are made so that they can rotate on spindles 29, as this will permit the logging tool to rotate, as it normally does during logging, inside the mop and prevent the latter from being twisted up. Because of the variations in the size of the mop that should be used in different sized boreholes, collars 16 are more effective if they can be easily removed from spindles 29. This is readily accomplished by splitting the collars 16 vertically, making provision for fastening and unfastening the two halves together as with a hinge and latch (not shown). Alternatively, caps 19 can be made removable from spindles 29 by any appropriate means so that collars 16 may be slipped off from spindles 29. It will be understood by those skilled in the art that the cap 19 at the top of the housing 14 is often called the head and will contain the necessary provisions to attach a cable or additional logging equipment thereto. Further, since it is only necessary to prevent the thermal and epithermal neutrons from the borehole 10 from producing high energy capture gamma rays in the vicinity of the detector 12, the neutron source 11 could be mounted from the bottom cap 19' where it would be outside the mop 17. This would be done for safety and convenience in handling the neutron source 11.

Protruding from the collars 16 are rubber fingers 20 which are of sufficient length to press against the side walls of the borehole 10 and are spaced circumferentially to keep the housing 14 pressed against the side of the borehole 10. This prevents the mop 17 from rotating as the sonde body 14 turns and makes certain that the neutrons and gamma rays will have to traverse as little noninformation-bearing space as possible. Other suitable means, such as a flat spring attached at each end to each collar as shown in FIG. 4 of copending application 618,821, filed October 29, 1956, by John T. Dewan, issued on October 1, 1960 as Patent No. 2,958,780, to maintain the sonde 14 eccentered in the borehole 10 may be used.

Typical electric actuating and utilization circuits are shown in block diagram form in which power supply 21 supplies the necessary power to the housing 14 through cable 22. The output from gamma ray detector 12 is fed through another conductor or set of conductors in cable 22 to amplifier 23, thence to pulse height analyzer 24 and thence to pulse counting circuits 25, 26 and 27 which are, in turn, connected to multichannel recorder 28. The manner in which these circuits operate to utilize information from the sonde 14 is understood by those skilled in this art.

FIG. 2 shows the plan view of the housing 14 and mop 17 in the borehole 10. As shown therein, the borosilicate glass fiber strips or ropes 17 are arranged in a circumferentially nonuniform fashion around the housing 14 so that the density of the borosilicate glass fiber in the well will be approximately the same at all points, even though the housing 14 is eccentered in the borehole 10 as a result of being pushed by the rubber fingers 20 against the side of the borehole 10. The even distribution of the borosilicate glass fiber 17 throughout the borehole 10 about the housing 14 is accomplished by starting with no borosilicate glass fiber at the place on the collars nearest the side of the borehole 10 and from there securing the glass fiber between the collars circumferentially in both directions around to the opposite position on the collar.

A further embodiment of the present inveniton is shown in FIG. 3 of the drawings. Here, a housing 14 contains a neutron source 11 and a gamma ray detector 12 with a neutron-gamma ray shield 13. A fluid displacing sleeve 30 substantially covers the housing 14 and is securely attached thereto by any convenient means. This sleeve 30 should be of a size which will go through the smallest portions of the borehole 10 and will substantially fill the smallest portions of the borehole 10 during its passage. This will insure maximum absorption of the undesired thermal and epithermal neutrons. It will be helpful if at least the outer layer of the sleeve 30 is flexible so that protrusions or constrictions in the borehole 10 will not interfere with the logging operation.

The sleeve 30 may be made of plastic or rubber and should be blended with a substance containing either boron or lithium or some other substance with a high thermal and epithermal neutron capture cross section and emitting gamma rays of under .5 mev. It should contain at least 1% by weight of natural boron or natural lithium or correspondingly less if the boron or lithium is enriched in the neutron-absorbing isotopes $B^{10}$ and $Li^6$. Boron carbide has been found to be a preferred substance for this purpose. Care should be taken to select a matrix that has as low a capture cross section as is feasible. A suitable material is Hycar rubber. Materials containing chlorine are best avoided.

The detector 12 will produce a higher output if it is closer to the gamma emitting formation. Hence, if the lengthwise bore through the sleeve 30 is eccentered, the instrument will be more sensitive.

Although our invention has been described in connection with the use of only one gamma ray detector, it should be understood that it will be useful with as many detectors in the sonde as the particular logging technique may require.

While particular embodiments of the present invention have been shown and described, it will be apparent to those skilled in the art that changes and modifications may be made without departing from this invention. Therefore, the invention should not be considered as limited to the precise embodiments disclosed, but the scope of the invention should be determined by reference to the appended claims.

What is claimed is:

1. Radioactive logging apparatus for investigating formations traversed by a borehole comprising a housing, a source of neutrons in said housing, gamma ray detection means in said housing spaced and shielded from said neutron source, and fluid-displacing means supported externally of said housing at least about said detection means, said fluid-displacing means comprising glass fibers having the element boron distributed therethrough to capture thermal and epithermal neutrons and to release capture gamma rays with less than .5 mev. energy.

2. Apparatus according to claim 1, in which said fluid-displacing means contains at least 1% by weight of the element boron uniformly distributed through its fluid displacing volume.

3. Radioactive logging apparatus for investigating formations traversed by a borehole comprising a housing, a source of neutrons positioned in said housing, a gamma ray detector spaced and shielded from said neutron source in said housing, said housing being surrounded on a substantial portion of its periphery by a glass fiber mop comprised of at least 1% of thermal and epithermal neutron absorbing material which emits capture gamma rays with less than .5 mev. energy.

4. Apparatus according to claim 3 in which the glass fiber mop is of sufficient fullness and flexibility to substantially spread throughout the borehole region adjacent said sonde and permeate said borehole region with at least 1% by volume of boron.

5. A radioactive well logging apparatus comprising a pressure-resistant tubular housing, a source of neutrons, a gamma ray detector, said source and said detector being mounted in said housing, at least a portion of said housing opposite said detector being transparent to gamma rays, shielding means to substantially curtail the amount of direct radiation from said neutron source that reaches said detector, and a fluid-displacing, gamma-ray transparent sleeve secured about said housing opposite said detector and comprised of a glass matrix material and at least 1% by weight of a material selected from the group consisting of boron and lithium having a high capture cross section of thermal and epithermal neutrons and emitting a low energy capture gamma ray, said sleeve extending outwardly from said housing a substantial distance in relation to the radius of its bore.

6. Apparatus according to claim 2, in which said fluid displacing means is substantially free of chlorine, hydrogen and iron, said fibers being secured at either end to said housing.

7. Radioactive well logging apparatus for investigating formations traversed by a borehole comprising: an elongated cylindrical housing, a source of neutrons in said housing, a scintillation-type gamma ray detector in said housing spaced longitudinally from said source, and fluid displacing means secured externally of said housing and including a gamma-ray transparent matrix of solid chlorine free material supported intermediate the ends of said housing and protruding outwardly therefrom at least about said detector, said matrix having distributed uniformly therethrough at least one percent by weight of a substance having a high neutron capture cross section selected from the group consisting of boron and lithium.

References Cited in the file of this patent

UNITED STATES PATENTS

| | | |
|---|---|---|
| 2,652,496 | Herzog et al. | Sept. 15, 1953 |
| 2,747,100 | Wyllie et al. | May 22, 1956 |
| 2,842,678 | Silverman | July 8, 1958 |
| 2,862,106 | Scherbatskoy | Nov. 25, 1958 |
| 2,910,591 | Baker | Oct. 27, 1959 |